Patented Sept. 30, 1924.

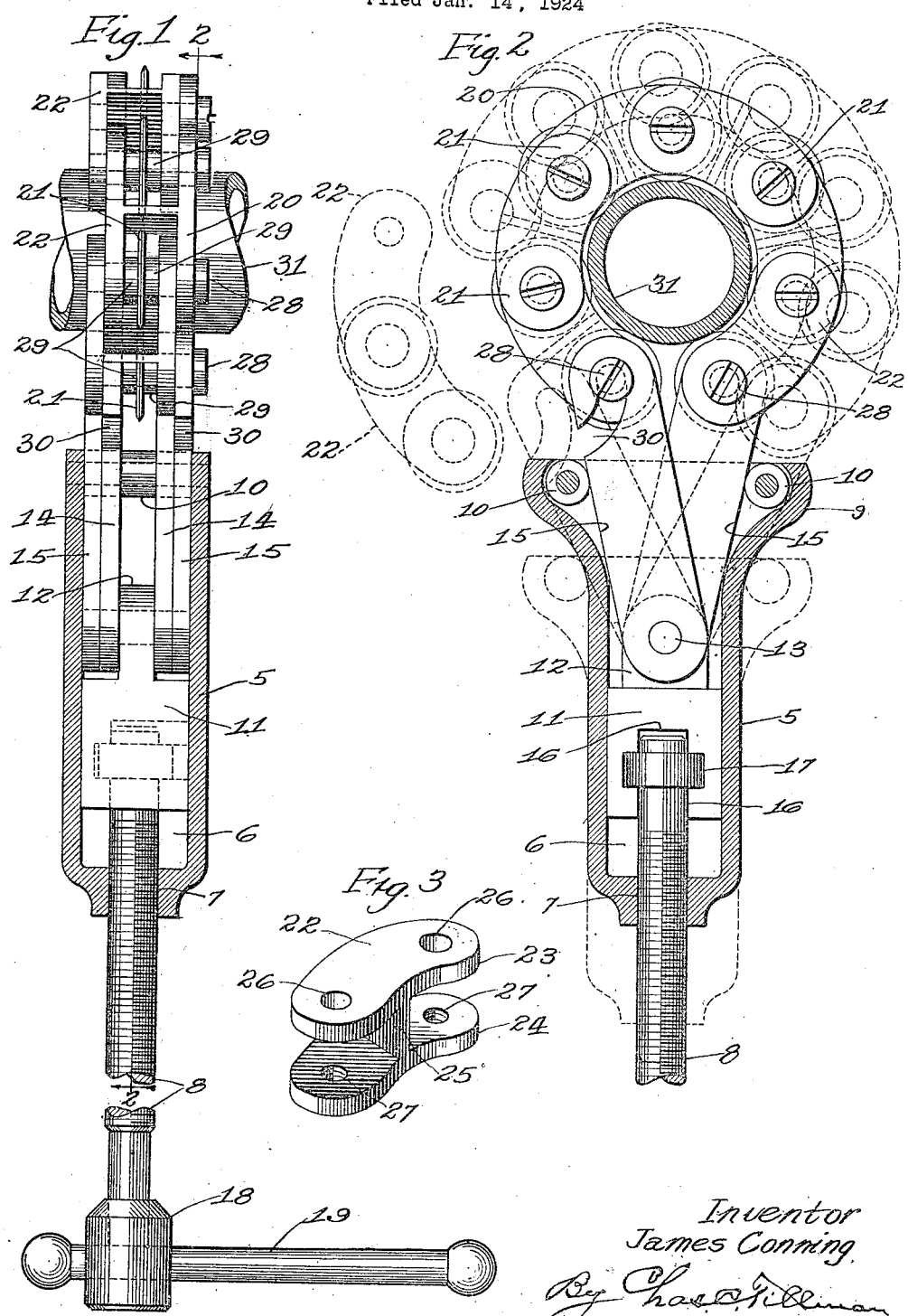

1,510,256

UNITED STATES PATENT OFFICE.

JAMES CONNING, OF CHICAGO, ILLINOIS.

PIPE CUTTER.

Application filed January 14, 1924. Serial No. 686,015.

*To all whom it may concern:*

Be it known that I, JAMES CONNING, a subject of Great Britain, and a resident of Chicago, in the county of Cook and State of Illinois, have invented certain new and useful Improvements in Pipe Cutters, of which the following is a specification.

This invention relates to improvements in a type of pipe cutters in which a linked or flexible element to surround the pipe and carrying spaced circular and rotatable cutters or disks to cut the same, is employed in connection with means for supporting said element and for adjusting it to pipes of different diameters, as well as, to cause it to grip the pipe, to the end, that the said cutters will be caused to make a circumferential incision therein when moved around or back and forth cross-wise of the pipe, and it consists in certain peculiarities of the construction, novel arrangement and combination of the various parts thereof as will be hereinafter more fully set forth and specifically claimed.

The principal object of the invention, is, the provision of a pipe cutter of the above mentioned general character, which shall be of an extremely simple and inexpensive construction, strong, durable and efficient in operation, with its parts so made, arranged and co-operating with one another, that the device can be readily and operatively applied to a pipe whether the same is fixedly mounted at its ends or has one or both of its ends free.

Another object of the invention is to provide a pipe cutter of such construction and arrangement of its parts as to enable pipes of irregular circumferences, or those that are not of true cylindrical shape to be readily cut thereby.

Still another object is the provision of a pipe cutter which shall normally have a range of adjustability of its parts to adapt it for use on pipes varying in size from the smallest to the largest size commonly used, yet, when required for use on pipes of extraordinary size, can have its flexible element, or cutter carrier, readily lengthened to a desired extent for circumscribing the pipe to be cut.

The invention contemplates, as another object thereof, the provision of a pipe cutter having parts thereof detachably connected together, to the end, that they can be readily assembled and when desired, disconnected, to permit them to be encased in a tool-box or other comparatively small container, besides permitting worn or damaged parts to be replaced by new or perfect ones.

Still another object is to provide a pipe cutter of such construction, size and arrangement of its parts that it can be readily and effectually operated by a single person.

Other objects and advantages of the invention will be disclosed in the following description and explanation.

In the accompanying drawing, which serves to illustrate an embodiment of the invention,—

Fig. 1 is a side view partly in elevation and partly in section of a pipe cutter constructed according to my improvements, showing it mounted on a portion of a pipe with its parts arranged for cutting the same.

Fig. 2 is a face view partly in section and partly in elevation taken on line 2—2 of Fig. 1, showing by continuous lines the parts arranged as shown in Fig. 1 and by dotted lines about the position the parts will occupy when arranged for operation on a pipe of considerably larger diameter and also illustrating the manner of extending the length of the linked member or cutter carrier of the device, and Fig. 3 is a detached perspective view of one of the links forming the cutter carrier.

Like numerals of reference refer to corresponding parts throughout the different views of the drawing.

The reference numeral 5 designates the supporting and guiding body for certain members of the device, which body is provided with a longitudinally extended cavity 6 which is preferably rectangular in cross-section and extends from near one end of the body to and through its other end as will be readily understood by reference to Figs. 1 and 2 of the drawing. The outer end of the body 5 is contracted and provided with a screw-threaded opening 7 for engagement with a screw-threaded adjusting rod 8 the threads of the opening 7 and those of the rod 8 being of left-handed construction. The upper end of the body 5 or that end thereof opposite its contracted end is laterally enlarged as at 9 and the cavity 6 is correspondingly flared or enlarged at its upper portion. Transversely journaled in the enlarged portion 9 of the body and at each side thereof is a roller 10 employed for the purpose to be presently explained. Slidably mounted in the guide-way or rectangular cavity 6 of the body 5 is a follower block 11 shaped in cross-section to correspond with its guide-way. This block is provided at its upper end with a longitudinally disposed extension 12 having a transverse opening therein for the reception of a pin or pivot 13 upon which are pivotally mounted at one of their ends on each side of the extension 12 a pair of clamping and releasing links 14 and 15, the links 14 being held in spaced relation to each other by means of the extension 12 on which they are mounted as will be understood by reference to Fig. 1 of the drawing. These links are extended between the rollers 10 on the body 5 outwardly. The follower or block 11 has transversely disposed therein a cross-shaped opening 16 which extends through one of the walls of the block 11 and also through its lower end or that end thereof opposite the extension 12 for the reception and retention of the inner end of the adjusting rod 8 and an enlargement 17 carried by said rod near its inner end. By this arrangement it is manifest that the rod 8 with its enlargement 17 can be readily placed within the opening 16 and positioned therein about as shown in Fig. 1, and that a swiveled connection between the rod and block will thereby be provided. The outer end of the rod 8 is provided with a head 18 which may be detachably mounted thereon. Extended through a suitable opening in the head 18 is a slidable handle 19 employed for turning the rod 8 in the proper direction to advance or retract the follower or block 11 which in turn will advance or retract the above mentioned links.

A chain or linked element designated as a whole by the numeral 20 is employed to carry a series of disk-shaped cutters 21 which are mounted on the links of the chain or linked element in a manner to be presently explained. The chain or linked element comprises a plurality of H-shaped links designated as a whole by the numeral 22. Each of these links comprises a pair of parallel members 23 and 24, see Fig. 3, which are connected about midway between their ends by means of a cross-piece 25 which may be and preferably is integral with said members. The members 23 and 24 of each link are provided with registering openings 26 and 27, the latter preferably being screw-threaded for engagement with the screw-threaded ends of screw bolts 28, one of which is located in the pair of said openings at each end of the members 23 and 24 of each link. These screw bolts are employed not only for pivotally connecting the links 22 together, but also for the purpose of providing axles or shafts for the disks or cutters 21, each of which disks is provided centrally thereof and on each of it sides with an orificed hub or boss 29 through which the bolts 28 are extended. As the links 22 overlap each other as shown in Fig. 1, the screw-threads in the member 27 of each alternate link may be omitted but otherwise the links composing the chain or linked element are of the same construction as shown in Fig. 3 and above described. The chain or linked element 20 is pivotally connected at one of its ends by means of one of the screw bolts 28 extended through the openings in one end of the link at said end of the chain to a pair of the links 14 and 15 on one side of an axial line through the extension 12 of the block or follower 11 which actuates said links, and the opposite end of the chain or linked element 20 is detachably connected to the pair of links 14 and 15 located on the opposite side of the axial line of said extension 12 by means of one of the screw bolts 28 located in the free end of the link forming the free end of the chain or flexible element.

For detachably connecting the last named link to the last named links 14 and 15, the last named pair of links 14 and 15 is each provided near its outer end with an arcuate slot 30 into which the bolt 28 just above mentioned can be placed so as to have its seat at the inner ends of said slots. By this arrangement it is manifest that the said bolt can be removed from the slots 30 so that the chain can be placed around the pipe 31 no matter whether it is fixedly supported at its ends or not, when by replacing the bolt 28 in the slots 30 and by turning the adjusting rod 8 in the proper direction, it is manifest that the block or follower 11 will be drawn towards the free end of the body 5, thus causing the links or arms 15 and 14 to co-act with the rollers 10 in such a way that the outer ends of said links will be forced towards each other thereby tightening the chain on the pipe and at the same time positioning the disks 21 in such a way that they will contact with the outer surface of the pipe when by moving the body 5 and rod 8 crosswise of the pipe, it is obvious the said disks or cutters will form incisions in the pipe to a sufficient depth to permit it to be broken by a slight blow, provided the pipe is made of cast material, and if not, by continuing the back and forth movement of the body and handle, it is apparent that the incisions may be cut entirely through the pipe.

If it is desired to lengthen the chain 20, it is manifest that after detaching the link at the free end of the chain from the clamping links 14 and 15 having the slots therein, another link shown in detached position and dotted lines in Fig. 2 may be connected at one of its ends to the link at the free end of the chain by means of the screw bolt 28 formerly positioned in said slots and by inserting another screw bolt through the openings in the free end of the detached link for engagement with the slots of the clamping links.

In order to assemble the parts of the device, it will be understood that, assuming that the follower block 11 and the rod 8 is detached from the body 5, and that the link 14 and 15 as well as the chain 20 are connected together as shown in the drawing, the end of the rod 8 having the enlargement 17 thereon, can be placed in the cross-shaped opening 16 of the block 11, when the opposite end of the rod 8 from which the head 18 has been removed, can be inserted in the enlarged end of the body 5 and then through the opening 7 in said body, thus enabling the block 11 to enter the guide-way 6 therefor. When in this position, the clamping links of the device will be interposed between the rollers 10 carried by the body 5 and it is apparent that by turning the rod 8 in the proper direction the block 11, as well as the clamping links, can be advanced or retracted with respect to the body 5, which should be firmly held in substantially a stationary manner. As the follower block is retracted, it is obvious that the chain 20 will be tightened on the pipe, and that when the block is advanced, the reverse movement of said parts will be caused.

Having thus fully described my invention, what I claim as new and desire to secure by Letters Patent is:

In a pipe cutter, the combination with a body having an elongated cavity flared at one of its ends, of a pair of spaced rollers transversely journaled in the flared end of said body, a block slidably mounted in said body, means connected to said block and extended therefrom through the end of said body opposite its rollers for reciprocating the block, a plurality of clamping links or toggles pivotally connected in pairs on a common pivot at one of their ends to said block, said pairs of links extending divergently between said rollers, the members of one pair of said clamping links each having a substantially diagonally disposed slot in its outer portion, said slots registering with one another, a linked element pivotally connected at one of its ends to the outer portion of the other pair of clamping links and having means at its other end to detachably engage said slot, and a plurality of disk cutters transversely journaled on the linked element in spaced relation to one another.

JAMES CONNING.